US008881504B2

(12) United States Patent
Gonze et al.

(10) Patent No.: US 8,881,504 B2
(45) Date of Patent: Nov. 11, 2014

(54) SYSTEM FOR PROVIDING POWER TO AN ELECTRICALLY HEATED CATALYST

(75) Inventors: Eugene V. Gonze, Pinckney, MI (US);
Michael J. Paratore, Jr., Howell, MI (US); Charles E. Solbrig, Ypsilanti, MI (US); Chang H. Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 13/560,136

(22) Filed: Jul. 27, 2012

(65) Prior Publication Data

US 2014/0026544 A1    Jan. 30, 2014

(51) Int. Cl.
*F01N 3/00*    (2006.01)
(52) U.S. Cl.
USPC .................. 60/284; 60/300; 60/303; 60/286
(58) Field of Classification Search
USPC .................. 701/36, 22; 60/384, 272–324
See application file for complete search history.

(56) References Cited

U.S. PATENT DOCUMENTS 8,475,333 B2 *   7/2013   Roos et al. ............... 477/20

* cited by examiner

*Primary Examiner* — Thomas Denion
*Assistant Examiner* — Kelsey Stanek
(74) *Attorney, Agent, or Firm* — Cantor Colburn LLP

(57) ABSTRACT

An exhaust gas treatment system for an internal combustion engine is provided. The exhaust gas system includes an exhaust gas conduit, a generator, a vehicle electrical system, a primary energy storage device, a rechargeable secondary energy storage device, an electrically heated catalyst ("EHC") device, and a control module. The primary energy storage device is selectively connected to the generator. The primary energy storage device has a threshold state of charge ("SOC"). The rechargeable secondary energy storage device is selectively connected to the generator and the vehicle electrical system. The EHC device is in fluid communication with the exhaust gas conduit. The EHC device has an electric heater that is selectively connected the generator for receiving energy and a selectively activated catalyst that is heated to a respective light-off temperature.

20 Claims, 2 Drawing Sheets

SYSTEM FOR PROVIDING POWER TO AN ELECTRICALLY HEATED CATALYST

FIELD OF THE INVENTION

Exemplary embodiments of the invention relate to exhaust gas treatment systems for internal combustion engines and, more particularly, to an exhaust gas treatment system that includes an electrically heated catalyst ("EHC") device having an electric heater that is selectively powered by a generator.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidation catalyst ("OC") device. The OC device includes a flow-through substrate and a catalyst compound applied to the substrate. The catalyst compound of the OC device induces an oxidation reaction of the exhaust gases once the OC device has attained a threshold or light-off temperature. One type of exhaust treatment technology for reducing $NO_x$ emissions is a selective catalyst reduction ("SCR") device. The SCR device includes a substrate, where a SCR catalyst compound is applied to the substrate. A reductant is typically sprayed into hot exhaust gases upstream of the SCR device. However, the SCR device also needs to reach a threshold or light-off temperature to effectively reduce $NO_x$. During a cold start of the engine, the OC device and the SCR device have not attained the respective light-off temperatures, and therefore generally may not effectively remove CO, HC, and $NO_x$ from the exhaust gases.

One approach for increasing the effectiveness of the OC and the SCR devices involves providing an electrically heated catalyst ("EHC") device upstream of the OC device and the SCR device. The EHC device includes a monolith and an electrical heater. The electrical heater is connected to an electrical source such as a vehicle battery that provides power to the electrical heater. However, providing power to the electrical heater of the EHC device may deeply discharge the vehicle battery, which in turn impacts battery life. Moreover, as power is supplied to the EHC, the interior and/or exterior lighting of the vehicle may substantially dim due to a voltage drop in the vehicle electrical system. If the vehicle battery has a relatively low state-of-charge ("SOC"), a more pronounced dimming will occur when compared to a vehicle battery that is fully charged. In some instances, the luminosity or intensity of the vehicle lighting may decrease up to about 50%. Accordingly, it is desirable to provide a system that efficiently provides power to the electrical heater of the EHC.

SUMMARY OF THE INVENTION

In one exemplary embodiment of the invention, an exhaust gas treatment system for an internal combustion engine is provided. The exhaust gas system includes an exhaust gas conduit, a generator, a vehicle electrical system, a primary energy storage device, a rechargeable secondary energy storage device, an electrically heated catalyst ("EHC") device, and a control module. The primary energy storage device is selectively connected to the generator. The primary energy storage device has a threshold state of charge ("SOC"). The rechargeable secondary energy storage device is selectively connected to the generator and the vehicle electrical system. The EHC device is in fluid communication with the exhaust gas conduit. The EHC device has an electric heater that is selectively connected the generator for receiving energy and a selectively activated catalyst that is heated to a respective light-off temperature. The control module is in communication with the EHC device, the generator, the primary energy storage device, and the rechargeable secondary energy storage device. The control module includes control logic for monitoring the EHC device to determine if the selectively activated catalyst of the EHC device has achieved the light-off temperature. The control module includes control logic for disconnecting the primary energy storage from the generator if the primary energy storage device is above the threshold SOC, and if the selectively activated catalyst is below the light-off temperature. The control module includes control logic for connecting the generator to the electric heater of the EHC device and the rechargeable secondary energy storage device to the vehicle electrical system, if the primary energy storage is disconnected from the generator, and if the selectively activated catalyst is below the light-off temperature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
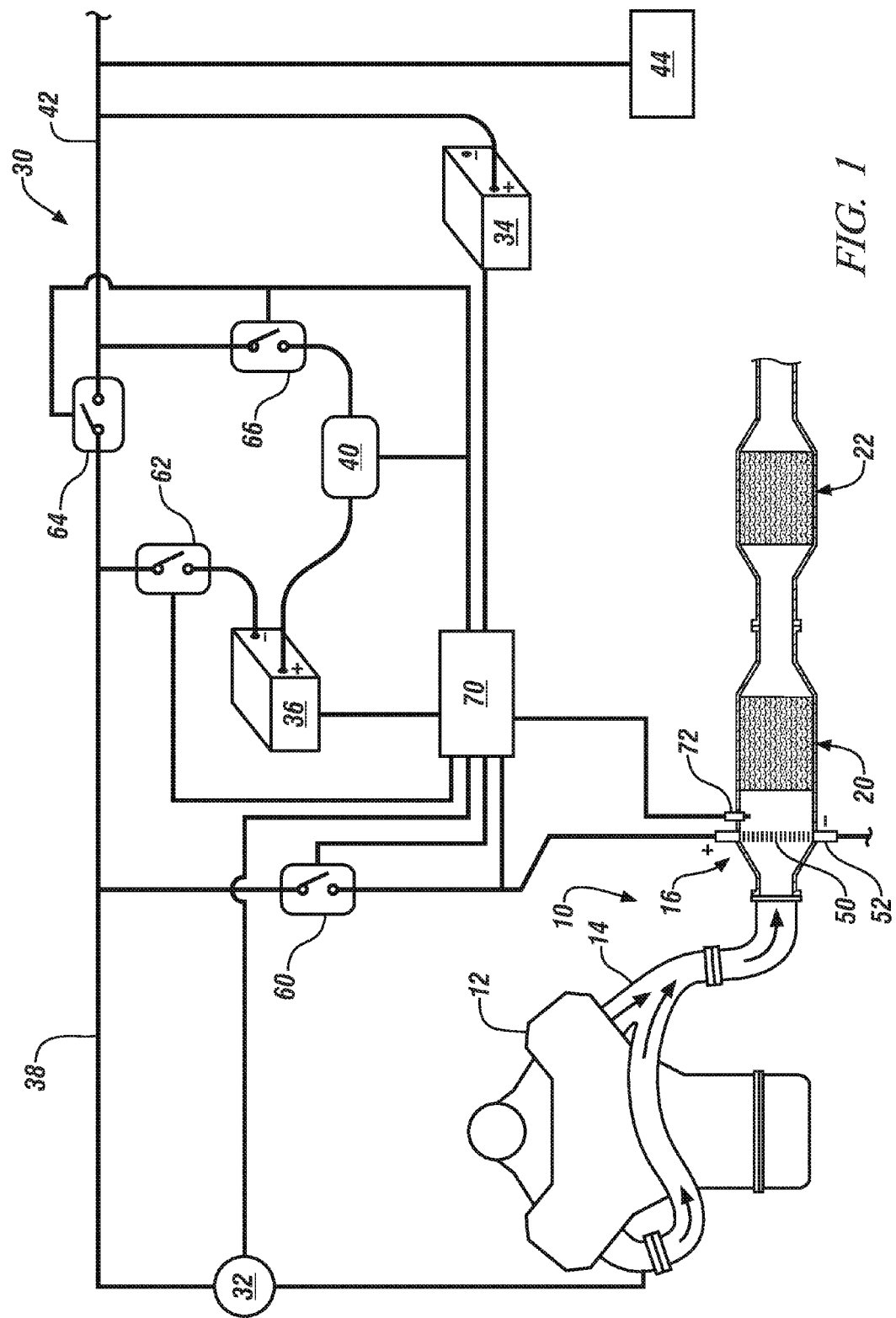
FIG. 1 is a schematic diagram of an exemplary exhaust gas treatment system and electrical system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion ("IC") engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. FIG. 1 illustrates an electrically heated catalyst ("EHC") device 16, an oxidation catalyst ("OC") device 20, and a selective catalytic reduction ("SCR") device 22. As can be appreciated, the exhaust gas treatment system of the present disclosure may include various combinations of one or more of the exhaust treatment devices shown in FIG. 1, and/or other exhaust treatment devices (not shown), and is not limited to the present example. An electrical system 30 is also illustrated, and includes a generator 32, a primary energy storage device 34, a secondary rechargeable energy storage device 36, a generator bus 38, an adjustable voltage regulator 40, a vehicle system bus 42, and a vehicle electrical system 44. The vehicle electrical system 44 may include, for example, interior and exterior lights, various motors (e.g., a blower motor, wiper motor, etc.), and other electrical components (not illustrated).

The EHC 16 is disposed upstream of the OC device 20 and the SCR device 22. The EHC device 16 includes a monolith 50 and an electrical heater 52, where the electrical heater 52 is selectively activated and heats the monolith 50. In one embodiment, the electrical heater 52 operates at a voltage of about 12-24 volts and at a power range of about 1-6 kilowatts, however it is understood that other operating conditions may be used as well. The EHC device 16 may be constructed of any suitable material that is electrically conductive such as the wound or stacked metal monolith 50. An oxidation catalyst compound (not shown) may be applied to the EHC device 16 as a wash coat and may contain platinum group metals such as platinum (Pt), palladium (Pd), rhodium (Rh) or other suitable oxidizing catalysts, or combination thereof. The catalyst of the EHC device 16 includes a light-off temperature, which is the temperature at which rapid HC oxidation occurs within the oxidation catalyst compound of the EHC device 16. In one exemplary embodiment, the EHC light-off temperature is about 250° C.

The OC device 20 is located downstream of the EHC device 16 and may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC device 20 is useful in treating unburned gaseous and non-volatile HC and CO, which are oxidized to form carbon dioxide and water.

The SCR device 22 may be disposed downstream of the OC device 20. In a manner similar to the OC device 20, the SCR device 22 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas in the presence of a reductant such as ammonia ("$NH_3$").

The electrical system 30 may include a plurality of switches to selectively connect the various components of the electrical system 30 with one another. Specifically, an EHC switch 60 is provided to selectively connect the electrical heater 52 of the EHC device 16 with a source of electrical power (e.g., the generator 32). A high voltage storage switch 62 is provided to selectively connect the secondary rechargeable energy storage device 36 with the generator 32. A bypass switch 64 is provided to selectively connect the primary energy storage device 34 with the generator 32. An assist switch 66 is provided to selectively connect the secondary rechargeable energy storage device 36 with the vehicle electrical system 44. In the embodiment as shown in FIG. 1, single-pole single-throw switches are utilized, however it is to be understood any type of switching element such as, for example, a mechanical switch actuated by a mechanical element (e.g., a rotating cam), relays, or transistors may be used.

The generator 32 is part of the engine 12, and converts mechanical power from the engine 12 into electrical power needed for various vehicle electrical loads. The generator 32 is coupled to a drivetrain (not illustrated) of a vehicle (not illustrated). During an unfueled braking event, a brake pedal (not illustrated) is pressed by a driver, and fueling to the engine 12 is temporarily stopped. Deceleration energy created by the drivetrain is used to turn the generator 32 to produce electrical energy during the unfueled braking event. In one embodiment, the generator 32 may operate at an unregulated high voltage mode when coupled to the drivetrain during the unfueled braking event. The unregulated high voltage mode generally turns the generator 32 without limitation and maximizes a generator magnetic field during the unfueled event. During the unregulated high voltage mode, the EHC switch 60 is switched to an open or off position to disconnect the EHC device 16 from the generator 32. The bypass switch 64 is also switched to the off position to disconnect the primary energy storage device 34 from the generator 32. The high voltage storage switch 62 and the assist switch 66 are switched to the on position. The generator 32 operates in the unregulated high voltage mode to charge the secondary rechargeable energy storage device 36.

The primary energy storage device 34 is a vehicle battery such as, for example, a lead acid battery ranging from about 12 to about 24 volts. Although a lead acid battery is discussed, it is to be understood that other types of energy storage devices may be used as well. The primary energy storage device 34 may be used to selectively provide electrical power to the vehicle electrical system 44. The primary energy storage device 34 includes a state of charge ("SOC") that is monitored. Specifically, the primary energy storage device 34 includes a primary SOC level that is a predetermined value selected to substantially prevent deep discharge of the primary energy storage device 34 (e.g., in one embodiment the primary SOC level is about 80-85% SOC).

The secondary rechargeable energy storage device 36 is generally any type of rechargeable energy storage device that withstands the relatively high voltages (e.g., generally 24V or higher) that may be experienced as the generator 32 charges the secondary rechargeable energy storage device 36 during the unregulated high voltage mode. For example, the secondary rechargeable energy storage device 36 may be an ultracapacitor or a lithium ion battery. In one embodiment, an ultracapacitor ranging from about 500 to about 1000 farads operating between about 16 volts (maximum charged voltage) to about 5 volts (minimum discharge voltage) may be used. The secondary rechargeable energy storage device 36 includes a SOC as well. If the SOC of the secondary rechargeable energy storage device 36 is above a secondary SOC level, this indicates that the secondary rechargeable energy storage device 36 has a level of charge sufficient to provide electrical power to operate the vehicle electrical system 44.

During operation of the exhaust gas treatment system 10, if the SOC of charge of the primary energy storage device 34 is above the primary SOC level, and if the electrical heater 52 of the EHC device 16 is activated (e.g., prior to light-off), the secondary rechargeable energy storage device 36 may be used to provide power to the vehicle electrical system 44.

Specifically, if the SOC of the secondary rechargeable energy storage device 36 is above the secondary SOC level, then the secondary rechargeable energy storage device 36 is connected to the vehicle electrical system 44 by the assist switch 66.

The voltage regulator 40 may be used to provide regulated or a generally constant voltage to the vehicle electrical system 44 in the event the secondary rechargeable energy storage device 36 is used to provide electrical power to the vehicle electrical system 44. Specifically, in the event the assist switch 66 is placed in the on position to connect the secondary rechargeable energy storage device 36 with the vehicle electrical system 44, the voltage regulator 40 may be used to ramp down the relatively high voltage supplied from the secondary rechargeable energy storage device 36. Thus, a generally constant voltage is supplied to the vehicle electrical system 44.

A control module 70 is operably connected to and monitors the engine 12, the exhaust gas treatment system 10, and the electrical system 30. Specifically, FIG. 1 illustrates the control module 70 operably connected to the engine 12, the generator 32, the EHC device 16, the primary energy storage device 34, the secondary rechargeable energy storage device 36 and the voltage regulator 40. The control module 70 is also in communication with the EHC switch 60, the high voltage storage switch 62, the bypass switch 64, and the assist switch 66. The control module 70 is also in communication with a temperature sensor 72 located downstream of the monolith 50 of the EHC device 16 to detect the temperature of the EHC device 16. In an alternative approach, the temperature sensor 72 is omitted, and instead the control module 50 includes control logic for determining the temperature of the EHC device 16 based on operating parameters of the exhaust gas system 10. Specifically, the temperature of the EHC device 16 may be calculated based on the exhaust flow of the engine 12, an input gas temperature of the engine 12, and the electrical power provided to the electrical heater 52.

The control module 70 includes control logic for monitoring the temperature of the EHC device 16 (e.g., either by the temperature sensor 72 or by operating parameters of the exhaust gas treatment system 10) to determine if the selectively activated catalyst of the EHC device 16 is below or above the light-off temperature. If the EHC device 16 is above the light-off temperature, the control module 70 includes control logic for deactivating the EHC device 16 by switching the EHC switch 60 to the off position (if the EHC device 16 is currently activated). After deactivation of the EHC device 16, the control module 70 monitors the generator 32 during the unfueled braking event to determine the electrical energy produced by the generator 32 due to deceleration of the drivetrain. Specifically, the control module 70 determines if the electrical energy produced by the generator 32 is above a threshold charging value. The threshold charging energy value is the amount of electrical energy sufficient to charge the secondary rechargeable energy storage device 36 during the unfueled braking event.

If the electrical energy produced by the generator 32 is above the threshold charging value, the control module 70 monitors the primary energy storage device 34 to determine if the SOC of the primary energy storage device 34 is above the primary SOC level (e.g., the level of SOC selected to substantially prevent deep discharge). If the SOC of the primary energy storage device 34 is above the primary SOC level, the control module 70 monitors the secondary rechargeable energy storage device 36 to determine if the SOC is below the secondary SOC level. If the secondary SOC is below the secondary SOC level, this is an indication that the secondary rechargeable energy storage device 36 does not have a level of charge sufficient to provide electrical power to the vehicle electrical system 44. In other words, the secondary rechargeable energy storage device 36 needs to be charged. Thus, the control module 70 includes control logic to switch the high voltage storage switch 62 to the on position, the bypass switch 64 to the off position, and the assist switch 66 to the on position. The generator 32 may operate in the unregulated high voltage mode to charge the secondary rechargeable energy storage device 36 to at least the secondary SOC level.

In the event the control module 70 determines the EHC device 16 is below the light-off temperature, the control module 70 monitors the generator 32 during the unfueled braking event to determine the electrical energy produced by the generator 32 due to deceleration of the drivetrain. Specifically, the control module 70 determines if the electrical energy produced by the generator 32 is above a threshold EHC energy level. The threshold EHC energy level is an amount of electrical energy sufficient to continue to provide electrical energy to the electrical heater 52 to heat the EHC device 16 to the light-off temperature.

If the electrical energy produced by the generator 32 is above the threshold EHC energy level, the control module 70 monitors the primary energy storage device 34 to determine if the SOC of the primary energy storage device 34 is above or below the primary SOC level (e.g., the level of SOC selected to substantially prevent deep discharge). If the primary energy storage device 34 is below the primary SOC level, the EHC switch 60 is turned off, and the electrical heater 52 of the EHC device 16 is deactivated.

If the SOC of the primary energy storage device 34 is above the primary SOC level, the control module 70 monitors the secondary rechargeable energy storage device 36 to determine if the SOC of the secondary rechargeable energy storage device 36 is above or below the secondary SOC level. If the control module 70 determines the secondary SOC of the rechargeable secondary energy storage device 36 is below the secondary SOC level (e.g., the secondary rechargeable energy storage device 36 does not have a level of charge sufficient to provide electrical power to the vehicle electrical system 44), then the EHC switch 60 is turned off, and the electrical heater 52 of the EHC device 16 is deactivated.

If the control module 70 determines that SOC of the secondary rechargeable energy storage device 36 is above the secondary SOC level, this is an indication that the secondary rechargeable energy storage device 36 has level of charge sufficient to provide electrical power to the vehicle electrical system 44. Thus, the control module 70 switches the assist switch 66 to the on position to connect the secondary rechargeable energy storage device 36 with the vehicle electrical system 44. The EHC switch 60 remains in the on position, where the generator 32 provides electrical power to the heater 52 of the EHC device 16. The bypass switch 64 is switched to the off position to disconnect the primary energy storage device 34 from the generator 32. The secondary rechargeable energy storage device 36 provides power to the vehicle electrical system 44 until the bypass switch 64 is switched back to the on position to connect the primary energy storage device 34 to the generator 32.

The exhaust gas treatment system 10 and electrical system 30 as described will substantially prevent deep discharge of the primary energy storage device 34 (e.g., the 12 volt vehicle battery) during heating of the electrical heater 52. This is because the secondary rechargeable energy storage device 36 may provide power to the vehicle electrical system 44 if the EHC device 16 is activated. This in turn improves the overall life of the primary energy storage device 34. Moreover, in some types of vehicle electrical systems that are currently available, as power is supplied to the EHC device the interior and/or exterior lighting of the vehicle may dim substantially, especially if the vehicle battery has a relatively low SOC. In contrast, the secondary rechargeable energy storage device 36 may provide electrical energy to the vehicle electrical system 44 during heating of the EHC device 16, instead of a vehicle battery that may have a relative low SOC. This in turn may reduce the amount of dimming experienced by the vehicle lighting system.

Figure 2:
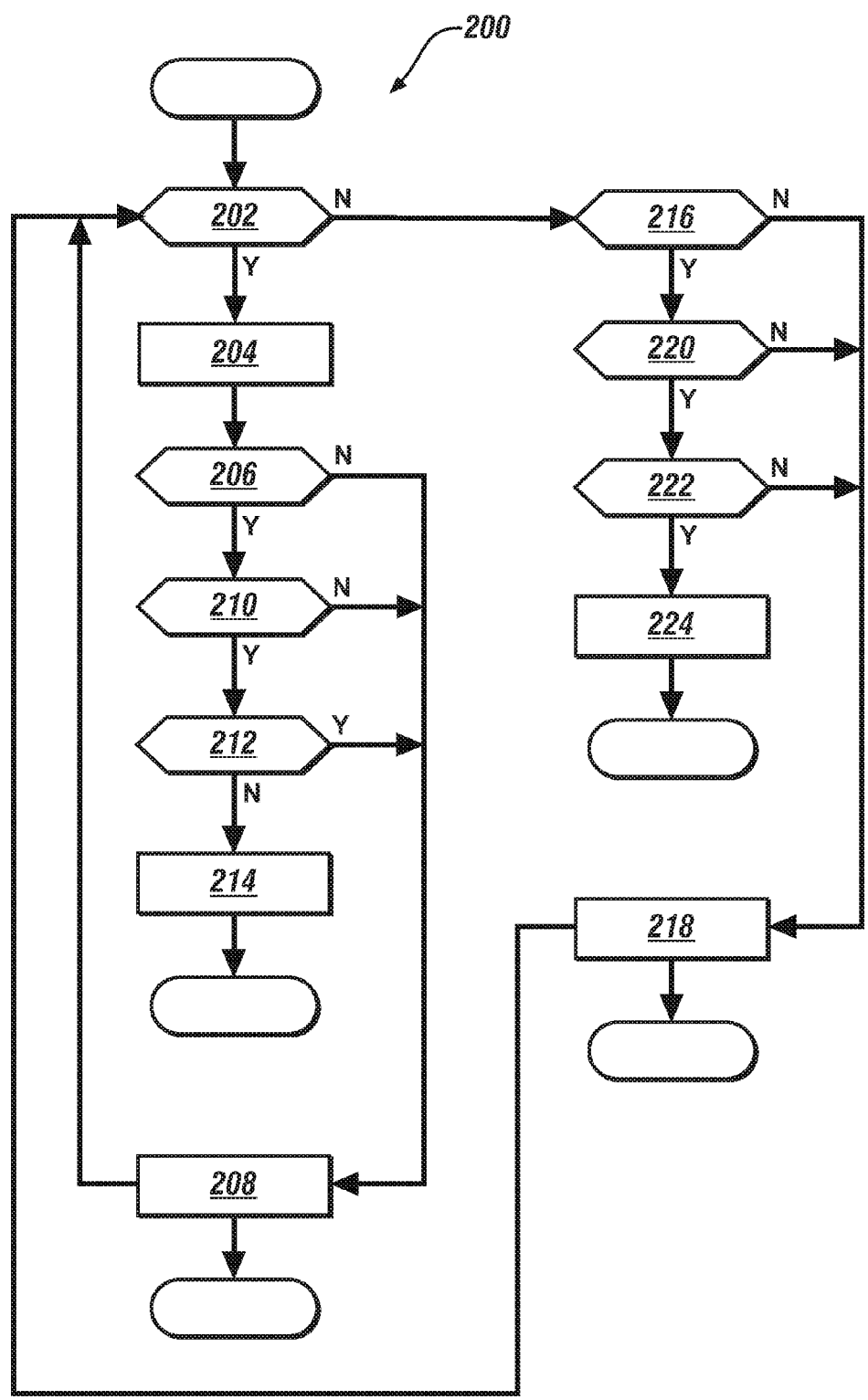
FIG. 2 is a process flow diagram illustrating a method of operating the exhaust gas treatment system and electrical system shown in FIG. 1.

A method of operating the exhaust gas treatment system 10 will now be explained. Referring to FIG. 2, an exemplary process flow diagram 200 of operating the exhaust gas treatment system 10 is shown. Referring generally to FIGS. 1-2, method 200 may begin at step 202, where the EHC switch 60 is in the on position and the electrical heater 52 heats the catalyst of the EHC device 16. The bypass switch 64 is also in the on position and the primary energy storage device 34 is connected to the vehicle electrical system 44. The high voltage storage switch 62 and the assist switch 66 are in the off position.

In step 202, the control module 70 includes control logic for monitoring the temperature of the EHC device 16 to determine if the EHC device 16 is above or below the light-off temperature. As shown in FIG. 1, in one embodiment the temperature sensor 72 may be provided to detect the temperature of the EHC device 16. Alternatively, the temperature sensor 70 may be omitted, and instead the control module 50 includes control logic for determining the temperature of the EHC 16 based on operating parameters of the exhaust gas system 10. If the EHC device 16 is not above the light-off temperature, method 200 may then proceed to step 216. If the EHC device 16 is above the light-off temperature, method 200 may then proceed to step 204.

In step 204, the heater 52 of the EHC device 16 is deactivated by switching the EHC switch 60 to the off position. Method 200 may then proceed to step 206.

In step 206, the control module 70 monitors the generator 32 during the unfueled braking event to determine the electrical energy produced by the generator 32 during deceleration of the drivetrain. If the electrical energy produced by the generator 32 is below or not at the threshold charging value (e.g., the amount of electrical energy sufficient to charge the secondary rechargeable energy storage device 36), then method 200 may proceed to step 208. In step 208, the bypass switch 64 remains in the on position. Method 200 may then terminate, or restart at step 202. If the electrical energy produced by the generator 32 is above the threshold charging value, method 200 may then proceed to step 210.

In step 210, the control module 70 monitors the primary energy storage device 34 to determine if the SOC of the primary energy storage device 34 is above the primary SOC level (e.g., the level of SOC selected to substantially prevent deep discharge). If the SOC of the primary energy storage device 34 is below the primary SOC level, method 200 may then proceed to step 208, where the bypass switch 64 remains on. Method 200 may then terminate. If the SOC of the primary energy storage device 34 is above the primary SOC level, method 200 may then proceed to step 212.

In step 212, the control module 70 monitors the secondary rechargeable energy storage device 36 for the SOC. If the SOC of the secondary rechargeable energy storage device 36 is above the secondary SOC level, method 200 may then proceed to step 208. Method 200 may then terminate. If the secondary SOC of the secondary rechargeable energy storage device 36 is below the secondary SOC level, this is an indication that the secondary rechargeable energy storage device 36 does not have a level of charge sufficient to provide electrical power to the vehicle electrical system 44. Method 200 may then proceed to step 214.

In step 214, the control module 70 switches the high voltage storage switch 62 and the assist switch 66 to the on position. The control module 70 turns the bypass switch 64 to the off position to disconnect the primary energy storage device 34 from the generator 32. The EHC switch 60 is in the off position. The generator 32 may now operate in the unregulated high voltage mode to charge the secondary rechargeable energy storage device 36. Method 200 may then terminate.

As described above, if the EHC device 16 is not above the light-off temperature, method 200 may then proceed to step 216. In step 216, the control module 70 monitors the generator 32 during the unfueled braking event to determine if the electrical energy produced by deceleration of the drivetrain is above the threshold EHC energy level. If the electrical energy produced is below the threshold EHC energy level, method 200 may then proceed to step 218. In step 218, the bypass switch 64 remains in the on position. However, the EHC switch 60 is switched to the off position. The high voltage switch 62 and the battery assist switch 64 remain in the off position. Method 200 may then terminate, or restart at step 202. If the electrical energy produced by the generator 32 is above the threshold EHC energy level, method 200 may then proceed to step 220.

In step 220, the control module 70 monitors the primary energy storage device 34 to determine if the SOC of the primary energy storage device 34 is below the primary SOC level (e.g., the level of SOC selected to substantially prevent deep discharge). If the SOC of the primary energy storage device 34 is below the primary SOC level, method 200 may proceed to step 218. Method 200 may then terminate, or restart at step 202. If the primary SOC of the primary energy storage device 34 is above the primary SOC level, method 200 may then proceed to step 222.

In step 222, the control module 70 monitors the secondary rechargeable energy storage device 36 to determine if the SOC is above the secondary SOC level. If the control module 70 determines the SOC of the secondary rechargeable energy storage device 36 is below the secondary SOC level (e.g., the secondary rechargeable energy storage device 36 does not have a level of charge sufficient to provide electrical power to the vehicle electrical system 44), then method 200 may proceed to step 218. Method 200 may then terminate, or restart at step 202. If the control module 70 determines that secondary SOC of the secondary rechargeable energy storage device 36 is above the secondary SOC level, method 200 may then proceed to step 224.

In step 224, the control module 70 switches the assist switch 66 to the on position to connect the secondary rechargeable energy storage device 36 with the vehicle electrical system 44. The bypass switch 64 is switched to the off position to disconnect the primary energy storage device 34 from the generator 32. The EHC switch 60 remains in the on position, and the high voltage storage switch 62 is in the off position. The secondary rechargeable energy storage device 36 provides power to the vehicle electrical system 44 until the bypass switch 64 is switched back to the on position to connect the primary energy storage device 34 to the generator 32. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
 an exhaust gas conduit in fluid communication with, and configured to receive an exhaust gas from the internal combustion engine;
 a generator;
 a vehicle electrical system;
 a primary energy storage device selectively connected to the generator, the primary energy storage device having a threshold state of charge ("SOC");
 a rechargeable secondary energy storage device selectively connected to the generator and the vehicle electrical system;
 an electrically heated catalyst ("EHC") device in fluid communication with the exhaust gas conduit, the EHC device having an electric heater that is selectively connected to the generator for receiving energy, and a selectively activated catalyst that is heated to a respective light-off temperature; and
 a control module in communication with the EHC device, the generator, the primary energy storage device, and the rechargeable secondary energy storage device, the control module including:
 a control logic for monitoring the EHC device to determine if the selectively activated catalyst of the EHC device has achieved the light-off temperature;
 a control logic for disconnecting the primary energy storage from the generator if the primary energy storage device is above the threshold SOC and if the selectively activated catalyst is below the light-off temperature; and
 a control logic for connecting the generator to the electric heater of the EHC device and the rechargeable secondary energy storage device to the vehicle electrical system if the primary energy storage is disconnected from the generator, and if the selectively activated catalyst is below the light-off temperature.

2. The exhaust gas treatment system of claim 1, wherein the control module includes control logic for monitoring the generator during an unfueled braking if the selectively activated catalyst is above the light-off temperature, and wherein the control module includes control logic for determining if the generator is producing energy above a threshold charging value.

3. The exhaust gas treatment system of claim 2, wherein the control module includes control logic for monitoring the rechargeable secondary energy storage device to determine a secondary threshold SOC.

4. The exhaust gas treatment system of claim 3, wherein the control module includes control logic for disconnecting the primary energy storage device from the generator if the primary energy storage device is above the threshold SOC, if the rechargeable secondary energy storage device is below the secondary threshold SOC, and if the generator is producing energy above the threshold charging value.

5. The exhaust gas treatment system of claim 4, wherein the control module includes control logic for connecting the generator to the rechargeable secondary energy storage device and disconnecting the generator from the electric heater if the primary energy storage device is disconnected from the generator.

6. The exhaust gas treatment system of claim 5, wherein the generator operates in an unregulated high voltage mode where a drivetrain turns the generator with substantially no limitation if the generator is connected to the rechargeable secondary energy storage device.

7. The exhaust gas treatment system of claim 1, wherein the control module includes control logic for monitoring the generator during an unfueled braking event to determine if the generator is producing energy above a threshold EHC energy value if the selectively activated catalyst is below the light-off temperature.

8. The exhaust gas treatment system of claim 7, wherein the control module includes control logic for monitoring the rechargeable secondary energy storage device to determine a secondary threshold SOC.

9. The exhaust gas treatment system of claim 8, wherein the control module includes control logic for disconnecting the primary energy storage device from the generator if the primary energy storage device is above the threshold SOC and the rechargeable secondary energy storage device is above the secondary threshold SOC.

10. The exhaust gas treatment system of claim 9, wherein the control module includes control logic for connecting the rechargeable secondary energy storage device to the vehicle electrical system and connecting the generator to the electric heater of the EHC device if the generator is producing energy above the threshold EHC energy value.

11. The exhaust gas treatment system of claim 1, wherein the threshold SOC of the primary energy storage device is predetermined value that is selected to substantially prevent deep discharge of the primary energy storage device.

12. The exhaust gas treatment system of claim 1, wherein the primary energy storage device is a vehicle battery ranging from about 12 volts to about 24 volts.

13. The exhaust gas treatment system of claim 1, wherein the rechargeable secondary energy storage device is one of an ultracapacitor and a lithium-ion battery.

14. The exhaust gas treatment system of claim 1, comprising a voltage regulator for providing a generally constant voltage to the vehicle electrical system if the secondary rechargeable energy storage device is used to provide electrical power to the vehicle electrical system.

15. An exhaust gas treatment system for an internal combustion engine, comprising:
 an exhaust gas conduit in fluid communication with, and configured to receive an exhaust gas from the internal combustion engine;
 a generator;
 a vehicle electrical system;
 a primary energy storage device selectively connected to the generator, the primary energy storage device having a threshold state of charge ("SOC");
 a rechargeable secondary energy storage device selectively connected to the generator and the vehicle electrical system, the rechargeable secondary energy storage device rechargeable having a secondary threshold SOC;
 an electrically heated catalyst ("EHC") device in fluid communication with the exhaust gas conduit, the EHC device having an electric heater that is selectively connected to the generator for receiving energy, and a selectively activated catalyst that is heated to a respective light-off temperature; and
 a control module in communication with the EHC device, the generator, the primary energy storage device, and the rechargeable secondary energy storage device, the control module including:

a control logic for monitoring the EHC device to determine if the selectively activated catalyst of the EHC device has achieved the light-off temperature;

a control logic for disconnecting the primary energy storage from the generator if the primary energy storage device is above the threshold SOC and if the selectively activated catalyst is below the light-off temperature;

a control logic for connecting the generator to the electric heater of the EHC device and the rechargeable secondary energy storage device to the vehicle electrical system if the primary energy storage is disconnected from the generator, and if the selectively activated catalyst is below the light-off temperature;

a control logic for monitoring the generator during an unfueled braking if the selectively activated catalyst is above the light-off temperature, and wherein the control module includes control logic for determining if the generator is producing energy above a threshold charging value; and a control logic for disconnecting the primary energy storage device from the generator if the primary energy storage device is above the threshold SOC, if the rechargeable secondary energy storage device is below the secondary threshold SOC, and if the generator is producing energy above the threshold charging value.

16. The exhaust gas treatment system of claim 15, wherein the control module includes control logic for connecting the generator to the rechargeable secondary energy storage device and disconnecting the generator from the electric heater if the primary energy storage device is disconnected from the generator.

17. The exhaust gas treatment system of claim 16, wherein the generator operates in an unregulated high voltage mode where a drivetrain turns the generator with substantially no limitation if the rechargeable secondary energy storage device is connected to the generator.

18. The exhaust gas treatment system of claim 15, wherein the control module includes control logic for monitoring the generator during an unfueled braking event to determine if the generator is producing energy above a threshold EHC energy value if the selectively activated catalyst is below the light-off temperature.

19. The exhaust gas treatment system of claim 18, wherein the control module includes control logic for disconnecting the primary energy storage device from the generator if the primary energy storage device is above the threshold SOC and the rechargeable secondary energy storage device is above the secondary threshold SOC.

20. The exhaust gas treatment system of claim 19, wherein the control module includes control logic for connecting the rechargeable secondary energy storage device to the vehicle electrical system and connecting the generator to the electric heater of the EHC device if the generator is producing energy above the threshold EHC energy value.

* * * * *